United States Patent [19]

Jinda et al.

[11] Patent Number: 4,530,993

[45] Date of Patent: Jul. 23, 1985

[54] POLY 2,2'-DICHLORO-4,4'-BIPHENYLENE PYROMELLITIMIDE FILM

[75] Inventors: Takuma Jinda, Shiga; Toshikazu Matsuda, Kusatsu; Masanori Sakamoto, Ehime, all of Japan

[73] Assignee: Director General of Agency of Industrial Science & Technology, Tokyo, Japan

[21] Appl. No.: 667,729

[22] Filed: Nov. 2, 1984

[51] Int. Cl.$^3$ ............................................. C08G 73/10
[52] U.S. Cl. ................................... 528/353; 528/188; 528/189; 528/229; 528/352
[58] Field of Search ............... 528/352, 353, 188, 189, 528/229

[56] References Cited

U.S. PATENT DOCUMENTS

| | | | |
|---|---|---|---|
| 3,410,826 | 11/1968 | Endrey | 528/353 |
| 3,619,461 | 11/1971 | Gay | 528/353 |
| 4,269,968 | 5/1981 | Duran et al. | 528/188 |
| 4,473,523 | 9/1984 | Sasaki et al. | 528/188 |

*Primary Examiner*—Lester L. Lee
*Attorney, Agent, or Firm*—Cushman, Darby & Cushman

[57] ABSTRACT

Disclosed is a polyimide film consisting essentially of 2,2'-dichloro-4,4'-biphenylene pyromellitimide units. This film has high tensile characteristics and excellent heat resistance.

3 Claims, No Drawings

POLY 2,2'-DICHLORO-4,4'-BIPHENYLENE PYROMELLITIMIDE FILM

BACKGROUND OF THE INVENTION (1) Field of the Invention

The present invention relates to a polyimide film having a high tensile strength and high elastic modulus and also having a very high heat resistance.

(2) Description of the Prior Art

Among organic polymers a wholly aromatic polyimides have the highest heat resistance, and these polymers have already been practically used in the form of a film or molded article in which this characteristic is effectively utilized. However, the tensile properties of these polymers are at very common levels and the strength and elastic modulus are not high. Recently, there has arisen a demand for a film having a high elastic modulus and a high heat resistance, in combination, in the field of base films for magnetic recording tapes.

SUMMARY OF THE INVENTION

Under this background, the present inventors carried out research with a view to providing an in-plane isotronic or monoaxially oriented film having the above-mentioned characteristics, and as a result, it has been found that there is a specific novel wholly aromatic polyimide suitable for attaining this object. The present invention was completed based on this finding.

More specifically, in accordance with the present invention, there is provided a polyimide film consisting essentially of 2,2'-dichloro-4,4'-biphenylene pyromellitimide units.

DETAILED DESCRIPTION OF THE PREFERRED EMBODIMENTS

The in-plane isotropic film of the present invention has a tensile strength of at least 20 kg/mm$^2$, usually 20 to 80 kg/mm$^2$, and an elastic modulus of at least 1000 kg/mm$^2$, usually 1000 to 3000 kg/mm$^2$, and the monoaxially oriented film of the present invention has a tensile strength of at least 30 kg/mm$^2$, usually 30 to 300 kg/mm$^2$ and an elastic modulus of at least 3000 kg/mm$^2$, usually 3000 to 25000 kg/mm$^2$. The film of the present invention also has an excellent heat resistance and chemical resistance and is therefore very valuable for use in various fields.

The polyimide of the present invention has no solvent for dissolving this polymer therein, once the polymer is once prepared. Therefore, a polyamic-acid as a precursor soluble in an organic solvent is prepared, and a solution of this precursor is formed into a film. The thus-formed precursor film is treated by appropriate means to effect cyclodehydration of the amic-acid unit and obtain the intended polyimide film. The process for the preparation of the polyamic-acid will now be described.

The monomers used in the present invention are 2,2-dichlorobenzidine as the diamine component and pyrommelitic dianhydride as the acid anhydride component. A polymer comprising this combination of the monomers is novel and has not been introduced in any literature reference. When both the monomers are reacted in substantially equimolar amounts in an amide type solvent at room temperature, a solution of a polyamic-acid is obtained. The inherent viscosity of the formed polyamic-acid is ordinarily at least 0.8 and preferably at least 1.5 (the method for determining the inherent viscosity will be described hereinafter). As the amide type solvent, there can be used N-methylpyrrolidone (NMP), N,N-dimethylacetamide, and N,N-dimethylformamide.

A small amount of a monomer other than the above-mentioned monomers may be used for the production of the polymer of the present invention. As the comonomer, there can be used p-phenylene diamine, m-phenylene diamine, benzidine, 4,4''-diamino-p-terphenyl, 2,7-diaminofluorene, 4,4'-diaminodiphenylmethane, 4,4'-diaminodiphenyl ether and 3,3'-diaminodiphenylsulfone as the diamine component, and 3,3',4,4'-diphenyltetracarboxylic dianhydride, 3,3'4,4'-benzophenone-tetracarboxylic dianhydride, and 2,3,6,7-naphthalenetetracarboxylic dianhydride as the acid anhydride component. The amount of the comonomer used is up to about 20 mole %.

The obtained solution of the polyamic-acid is formed into a film. For this operation, the ordinary casting process is adopted, but this process is divided into the following three methods according to the difference of the imidization means.

According to the first method, the solution of the polyamic-acid is directly cast on a flat sheet or the solution of the polyamic-acid is extruded on a belt or drum through a slit die, and the formed film is heated to evaporate the solvent and advance the thermal cyclodehydration.

According to the second method, the same procedures as adopted in the first method are adopted to the midway point, and after a part of the solvent is evaporated, the film is immersed in a dehydrating agent to chemically advance the imidization. An aliphatic monobasic anhydride such as acetic anhydride or propionic anhydride is preferred as the chemical dehydrating agent. An organic base such as pyridine, 3-methylpyridine, 3,5-lutidine or quinoline may be used as the catalyst for this chemical dehydration. Furthermore, another organic solvent may be used as a diluent. As the diluent, there can be mentioned, dioxane, benzene, toluene, chloroform, carbon tetrachloride, and acetonitrile. The chemical cyclodehydration is carried out at a temperature of 15° C. to 50° C. for 10 minutes to 1 day.

According to the third method, a chemical dehydrating agent is added to the solution of the polyamic-acid under a temperature condition such as will not cause substantial cyclodehydration (at a temperature not higher than 10° C.), the solution is then shaped into a film and gelation is caused by elevating the temperature to a level causing cyclodehydration to give a shape-retaining property. The temperature is ordinarily 50° C. to 150° C. The same chemical dehydrating agents as mentioned above with reference to the second method may be used. The chemical dehydrating agent is preferably used in an amount of 1.0 to 3.0 moles per mole of the polyamic acid. An organic base may be added as the catalyst. The temperature of the gelled film is further elevated to evaporate the solvent and completely advance the cyclodehydration.

In the case of the in-plane isotropic film, a special drawing operation is not necessary at any stage of the above process. However, to impart higher tensile characteristics, it is preferable to perform biaxial drawing. Either simultaneous biaxial drawing or subsequent biaxial drawing may be adopted. The draw ratio in each direction is 1.05 to 1.3. When high tensile characteristics in one direction are desired, the film should be monoaxially drawn. In this case, the draw ratio is 1.2 to 2.0.

The monoaxial or biaxial drawing operation may be carried out in the state wherein a part of the solvent is left or after the solvent has been completely evaporated. Ordinarily, the former method is preferred because drawing is possible at lower temperatures. Furthermore, this heat drawing may be performed by elevating the temperature stepwise.

The heat-drawn or undrawn film is finally heat treated at a higher temperature. It is preferred that the heat treatment temperature be at least 400° C. Air or an inert gas such as nitrogen is used as the atmosphere for the heat treatment.

The high tensile characteristics of the polyimide film of the present invention are such that in the case of the in-plane isotropic film, the tensile strength is at least 20 kg/mm$^2$ and the elastic modulus is at least 1000 kg/mm$^2$, and in the case of the monoaxially oriented film, the strength is at least 30 kg/mm$^2$ and the elastic modulus is at least 3000 kg/mm$^2$. Furthermore, the polyimide film of the present invention has a very high heat resistance and chemical resistance and is very valuable for use in various fields. For example, the polyimide film of the present invention may be used as a base film of a magnetic recording tape, a heat-resistant insulating member, or for semiconductors such as IC. Moreover, the polyimide film of the present invention may be used in the form of a laminate film as a structural material.

The present invention will now be described in detail with reference to the following examples and comparative examples.

In the examples, the inherent viscosity ($\eta_{inh}$) was measured at 25° C. with respect to a dilution of 0.5 g of the polymer in 100 ml of NMP as the solvent.

The tensile properties were determined at a sample length of 25 mm and a pulling speed of 10 mm/min by using a Tensilon tester supplied by Toyo Sokki K.K. In the case of the in-plane film, the sample width was 5 mm.

EXAMPLE 1

This example is given to illustrate the preparation of an undrawn film of poly(2,2'-dichlo-4,4-biphenylene pyromellitimide) from a polyamic-acid solution containing a chemical dehydrating agent added thereto, as well as the preparation of this polyamic-acid from 2,2'-dichlorobenzidine and pyromellitic dianhydride.

In 100 ml of dehydrated NMP was dissolved 7.34 g (29.0 millimoles) of 2,2'-dichlorobenzidine, and 6.36 g (29.1 millimoles) of pyromellitic dianhydride was added under cooling with a water bath maintained at 20° C. with violent stirring. Then, polymerization was conducted at room temperature for 5 hours to obtain a solution of a polyamic-acid having an inherent viscosity $\eta$inh of 2.45 (the polymer concentration was 12.1%).

Then, 37.7 g of the thus-formed solution was diluted with 15 ml of NMP and the solution was cooled with a dry ice-acetone bath maintained at −10° C. A mixture comprising 2.12 g (equivalent to the amount of the amic-acid units) of acetic anhydride, 0.82 g of pyridine and 5 ml of NMP was added dropwise over a period of 5 minutes. The mixture was stirred for 5 minutes (the polymer concentration was 7.5%). The solution was cast on a glass plate and heated in an oven maintained at 70° C. for 1 hour to obtain a chemically dehydrated film having a polymer concentration of 70%. The film was peeled from the glass plate, fixed to an 8 cm-square aluminum frame, and treated at 300° C. in air for 30 minutes. The tensile characteristics of this film (having a thickness of 11.2 μm) were a tensile strength of 33 kg/mm$^2$, an elongation of 1.7%, and an elastic modulus of 2050 kg/mm$^2$.

The film was further heat-treated at 450° C. in air for 4 minutes, whereby the tensile strength and elongation characteristics were greatly improved. Namely, it was found that the heat-treated film had a tensile strength of 46 kg/mm$^2$, an elongation of 4.2%, and an elastic modulus of 1930 kg/mm$^2$.

A commercially available Kapton film composed of poly(4,4'-oxydiphenylene pyromellitimide) is characterized by a tensile strength of 20 kg/mm$^2$, an elongation of 72%, and an elastic modulus of 300 kg/mm$^2$. Thus, the tensile strength of the polyimide film of the present invention is 2.3 times the tensile strength of this commercially available film and the elastic modulus of the film of the present invention is 6.4 times the elastic modulus of the commercial film.

When the film of the present invention was subjected to the thermogravimetric analysis, it was found that the 5% weight loss temperature was 550° C. in nitrogen and 525° C. in air (in each case, the temperature-elevating rate was 10° C./min). Thus, it was confirmed that the heat resistance of the film of the present invention was very high.

EXAMPLE 2

This example is given to illustrate the preparation of a monoaxially oriented film of poly(2,2'-dichloro-4,4'-biphenylene pyromellitimide).

The chemically dehydrated film having a polymer concentration of 70%, which was prepared in Example 1, was pealed from the glass plate and cut to a width of 7 mm. The cut film was manually drawn at a draw ratio of 1.5 by using a hot plate maintained at 190° C. The film was then treated at 300° C. in air for 30 minutes and subjected to a heat treatment under tension for 5 seconds by using a hot plate maintained at 400° C. Then, the film was heat-treated under relaxation at 450° C. in air for 2 minutes. The obtained film (3.2 mm in width and 14.5 μm in thickness) had a tensile strength of 131 kg/mm$^2$, an elongation of 1.3%, and an elastic modulus of 10300 kg/mm$^2$. Thus, it was confirmed that the film had a high tensile strength and a high elastic modulus.

COMPARATIVE EXAMPLE 1

This comparative example is given to illustrate preparation of a film of poly(p-phenylene pyromellitimide).

In the same manner as described in Example 1, 4.76 g (44.0 millimoles) of p-phenylene diamine was reacted with 9.65 g (44.2 millimoles) of pyromellitic dianhydride in 130 ml of NMP to obtain a polyamic-acid solution having a polymer concentration of 10.0% and an inherent viscosity ($\eta_{inh}$) of 2.75.

Then, 36.8 g of the solution was diluted with NMP, the solution was cooled to −10° C., and a mixture comprising 2.30 g (equivalent to the amount of the amic-acid units) of acetic anhydride, 0.89 g of pyridine, and a small amount of NMP was added dropwise (the polymer concentration was 6.9%).

The solution was cast on a glass plate, treated in an oven maintained at 70° C. for 1 hour, fixed to an 8 cm-square aluminum frame, and heat-treated in an oven maintained at 300° C. for 30 minutes. The film taken out was broken, and the broken pieces were so brittle that they were crumbled readily by the fingers.

EXAMPLE 3

This example is given to illustrate the results of the heat resistance test of an undrawn film of poly(2,2'-dichloro-4,4'-biphenylene pyromellitimide).

In the same manner as described in Example 1, 2,2'-dichlorobenzidine was reacted with pyromellitic dianhydride in NMP to obtain a polyamic-acid solution having an inherent viscosity ($\eta_{inh}$) of 2.85 and a polymer concentration of 12.0%. Then, 42.5 g of the solution was diluted with 20 ml of NMP, and the solution was cooled to $-10°$ C. A mixture comprising 2.65 g (1.2 equivalents to the amount of the amic-acid units) of acetic anhydride, 1.0 g of pyridine, and 2 ml of NMP was added dropwise to the solution (the polymer concentration was 7.5%). The solution was cast on a glass plate and heated in an oven maintained at 70° C. for 1 hour. The formed film was peeled from the glass plate, fixed to a 12 cm-square aluminum frame, and heat-treated at 280° C. for 25 minutes and at 420° C. for 4 minutes. The thus-obtained undrawn film (9.5 μm in thickness) had a tensile strength of 49 kg/mm$^2$, an elongation of 11.3%, and an elastic modulus of 1690 kg/mm$^2$.

The film was treated in air maintained at 300° C. for 24 hours. The treated film had a tensile strength of 47 kg/mm$^2$, an elongation of 9.2%, and an elastic modulus was 1680 kg/mm$^2$. Namely, the strength retention ratio was 96% and the elongation retention ratio was 81%. Thus, it was confirmed that the film had a very excellent heat resistance.

EXAMPLE 4

This example is given to illustrate the preparation of undrawn and monoaxially drawn films of poly(2,2'-dichloro-4,4'-biphenylene pyromellitimide) according to the heat cyclodehydration method.

In the same manner as described in Example 1, 2,2'-dichlorobenzidine was reacted with pyromellitic dianhydride in NMP to obtain a polyamic-acid solution having an inherent viscosity ($\eta_{inh}$) of 3.02 and a polymer concentration of 12%. Then, 51.2 g of the solution was diluted with 17 ml of NMP so that the polymer concentration was 9.0%. The diluted solution was cast on a glass plate and heated in an oven maintained at 90° C. for 20 minutes. The thus-obtained film having a polymer concentration of 65% was peeled from the glass plate, fixed to a 12 cm-square aluminum frame, and heat-treated at 280° C. for 37 minutes and at 420° C. for 4 minutes. The thus-obtained undrawn film (12.7 μm in thickness) had a tensile strength of 55 kg/mm$^2$, an elongation of 13.7%, and an elastic modulus of 1830 kg/mm$^2$.

The above film having a polymer concentration of 65% was cut to a width of 10 mm, and the cut film was manually drawn at a draw ratio of 1.49 in air maintained at 200° C. The film was heat-treated in an oven at 210° C. for 10 minutes and at 280° C. for 30 minutes. Then, the film was heat-treated under tension by using a hot plate maintained at 350° C. for 5 seconds, and heat-treated in an oven maintained at 420° C. for 3 minutes. The obtained monoaxially orientated film (4.7 mm in width and 16.7 μm in thickness) had a tensile strength of 154 kg/mm$^2$, an elongation of 1.8%, and an elastic modulus of 9550 kg/mm$^2$. Thus, it was confirmed that the film had very high tensile strength and elastic modulus.

When the tensile properties of the monoaxially orientated film were determined at a sample length of 100 mm and a pulling speed of 10 mm/min, it was found that the tensile strength was 146 kg/mm$^2$, the elongation of 1.1%, the elastic modulus was 14200 kg/mm$^2$. This elastic modulus value was larger than that obtained at a sample length of 25 mm. This fact means that there is a compliance in a measuring system for tensile properties, which is especially large at a short sample length, e.g., 25 mm, when the sample length was extrapolated as infinity, namely, the system compliance is corrected, the elastic modulus was 16300 kg/mm$^2$.

We claim:

1. A polyimide film consisting essentially of 2,2'-dichloro-4,4'-biphenylene pyromellitimide units.

2. A polyimide film as set forth in claim 1, which is an in-plane isotropic film having a tensile strength of at least 20 kg/mm$^2$ and an elastic modulus of at least 1000 kg/mm$^2$.

3. A polyimide film as set forth in claim 1, which is a monoaxially drawn film having a tensile strength of at least 30 kg/mm$^2$ and an elastic modulus of at least 3000 kg/mm$^2$.

* * * * *